US012636913B2

(12) United States Patent (10) Patent No.: US 12,636,913 B2

Noguchi (45) Date of Patent: May 26, 2026

(54) MOTORCYCLE TIRE

(71) Applicant: Sumitomo Rubber Industries, Ltd., Hyogo (JP)

(72) Inventor: Yoshihisa Noguchi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 19/057,628

(22) Filed: Feb. 19, 2025

(65) Prior Publication Data

US 2025/0296388 A1 Sep. 25, 2025

(30) Foreign Application Priority Data

Mar. 19, 2024 (JP) ................................. 2024-044024

(51) Int. Cl.
*B60C 11/00* (2006.01)

(52) U.S. Cl.
CPC ........ *B60C 11/0008* (2013.01); *B60C 11/005* (2013.01); *B60C 11/0075* (2013.01); *B60C 2011/0025* (2013.01); *B60C 2011/0033* (2013.01); *B60C 2200/10* (2013.01)

(58) Field of Classification Search
CPC ............... B60C 11/005; B60C 11/0075; B60C 2011/0025

See application file for complete search history.

(56) References Cited

U.S. PATENT DOCUMENTS

| | | | | |
|---|---|---|---|---|
| 11,465,447 | B2 | 10/2022 | Kono | |
| 2013/0153111 | A1* | 6/2013 | Muramatsu | B60C 11/005 152/538 |
| 2015/0151580 | A1* | 6/2015 | Boudu, Jr. | B60C 1/0016 152/209.5 |
| 2024/0157732 | A1* | 5/2024 | Shibamoto | B60C 1/0016 |

FOREIGN PATENT DOCUMENTS

| | | | | | |
|---|---|---|---|---|---|
| JP | 02-147410 | A | * | 6/1990 | |
| JP | 2002-059709 | A | * | 2/2002 | B60C 11/005 |
| JP | 2015-030387 | A | * | 2/2015 | |
| JP | 7056227 | B2 | | 4/2022 | |

OTHER PUBLICATIONS

Machine translation for Japan 02-147410 (Year: 2026).*
Machine translation for Japan 2002-059709 (Year: 2026).*
Machine translation for Japan 2015-030387 (Year: 2026).*

* cited by examiner

*Primary Examiner* — Steven D Maki

(74) *Attorney, Agent, or Firm* — Greenblum & Bernstein, P.L.C.

(57) ABSTRACT

A motorcycle tire includes a tread portion having a crown region extending across a tire equatorial plane, and a pair of shoulder regions located axially outside the crown region. A tread rubber includes a surface layer of first rubber arranged on the radially outer side, a bottom layer of third rubber arranged on the radially inner side, and a pair of middle layers of second rubber arranged between the surface layer and the bottom layer. In terms of a loss tangent tan δ at 100° C., the second rubber is greater than the first rubber and the (Continued)

third rubber. The surface layer and the bottom layer extend from one shoulder region to the other shoulder region through the crown region. Each middle layer extends through the respective shoulder region and is not arranged in the crown region. The surface layer and the bottom layer are directly connected in the crown region.

20 Claims, 2 Drawing Sheets

MOTORCYCLE TIRE

RELATED APPLICATIONS

This application claims the benefit of foreign priority to Japanese Patent Applications No. JP2024-044024, filed Mar. 19, 2024, which is incorporated by reference in its entirety.

FIELD OF THE INVENTION

The present disclosure relates to a motorcycle tire.

BACKGROUND OF THE INVENTION

Japanese Patent No. 7056227 describes a motorcycle tire with multi-layered tread rubber. The above tread rubber includes a cap rubber that forms a tread surface and a base rubber arranged radially inside the cap rubber, and the loss tangent tan δ of the cap rubber is smaller than the loss tangent tan δ of the base rubber.

SUMMARY OF THE INVENTION

A motorcycle tire having a tread rubber of a multi-layer structure as described above can achieve both wear resistance and steering stability during high-speed running, compared to a motorcycle tire with a tread rubber of a single structure. Therefore, in recent years, multi-layered tread rubber is increasingly being used in many motorcycle tires. In particular, attempts have been made to place a rubber layer with a large loss tangent tan δ inside the cap rubber in order to achieve high grip performance in motorcycle tires suitable for racing and other sports driving.

However, rubber with a large loss tangent tan δ has a large hysteresis loss and is prone to heat generation, therefore, it tends to become hot due to continuous running at high speeds. Further, the rubber layer with a large loss tangent tan δ is covered with the cap rubber, thereby, it is difficult to cool the rubber layer by the running wind. Therefore, blow damage to the tread rubber may occur due to the heat generation in the tread rubber having such a multi-layer structure.

Furthermore, in racing, high grip force is most required during cornering, where the vehicle body is tilted to give a camber angle to the tires, particularly in mid-bank (during acceleration) and full-bank (during cornering) situations where either one of the shoulder regions of the tread rubber touches the ground. Thereby, it is desirable for motorcycle tires to have high grip during cornering.

On the other hand, during straightaway driving, if the grip force of the tread rubber is too high, the maximum speed is suppressed by the energy loss of the rubber.

The present disclosure was made in view of the above, and a primary object thereof is to provide a motorcycle tire capable of suppressing the blow damage to the tread rubber caused by the heat generation during high-speed running. Further, in a preferred embodiment, the present disclosure has an object to increase the grip force during cornering. Furthermore, in a preferred embodiment, the present disclosure has an object to increase the maximum speed during straightaway driving.

The present disclosure is a motorcycle tire including:
a tread portion having a pair of tread edges;
a pair of sidewall portions;
a pair of bead portions;
a carcass extending between the bead portions;

a tread reinforcing layer arranged radially outside the carcass and having reinforcing cords; and
a tread rubber arranged radially outside the tread reinforcing layer, wherein
the tread portion includes a crown region extending across a tire equatorial plane, and a pair of shoulder regions each located axially outside the crown region on a respective axial side thereof,
each of the shoulder regions includes a respective one of the tread edges,
the tread rubber includes a surface layer made of a first rubber arranged on the outer side in the tire radial direction, a bottom layer made of a third rubber arranged on the inner side in the tire radial direction, and a pair of middle layers made of a second rubber arranged between the surface layer and the bottom layer,
the second rubber has a loss tangent tan δ at 100 degrees Celsius greater than a loss tangent tan δ at 100 degrees Celsius of the first rubber and a loss tangent tan δ at 100 degrees Celsius of the third rubber,
each of the surface layer and the bottom layer extends from one of the shoulder regions to the other one of the shoulder regions through the crown region,
each of the middle layers extends through a respective one of the shoulder regions to have an inner end in the tire axial direction terminating so as not to be positioned in the crown region, and
the surface layer and the bottom layer are directly connected to each other in the crown region.

It is possible that the motorcycle tire of the present disclosure suppresses the blow damage to the tread rubber caused by the heat generation during high-speed running.

DETAILED DESCRIPTION OF THE INVENTION

An embodiment of the present disclosure will now be described in conjunction with accompanying drawings.

It should be understood that the drawings may contain exaggerated representations and representations that differ from the dimensional ratios of the actual structure in order to aid in understanding the present disclosure. Further, in case of multiple embodiments, identical or common elements are assigned with the same reference signs throughout the embodiments, and redundant explanations are omitted. Furthermore, the specific configurations shown in the embodiments and the drawings are intended to aid in understanding the contents of the present disclosure, and the present disclosure is not limited to the specific configurations illustrated.

Figure 1:
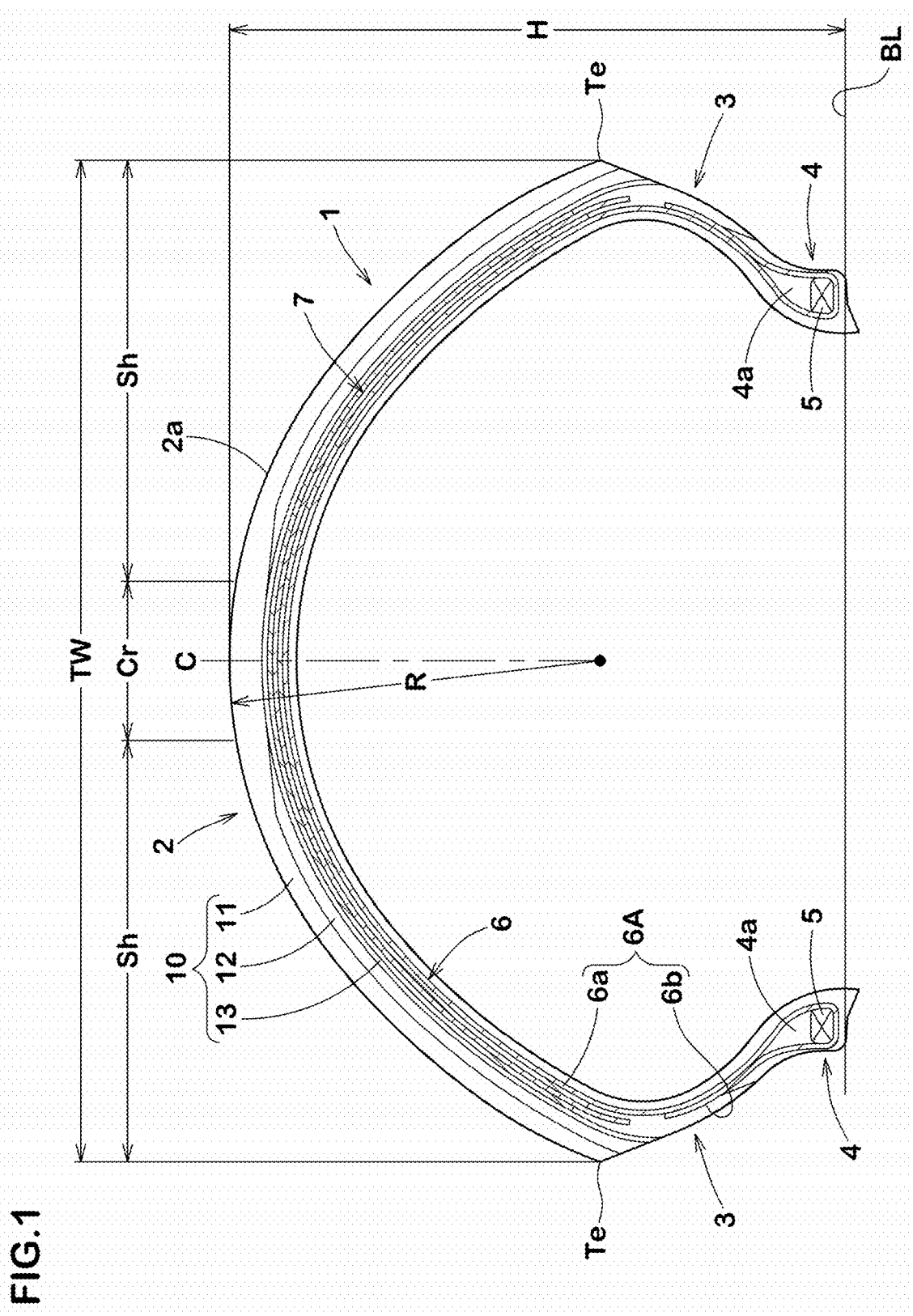
FIG. 1 is a cross-sectional view of a motorcycle tire according to the present disclosure in a dimension-determining state.

FIG. 1 is a cross-sectional view of a motorcycle tire according to the present embodiment (hereinafter, may be simply referred to as a "tire"). The tire 1 of the present embodiment is suitable for use in racing on a circuit, for example. The tire 1 as such is subjected to straightaway driving and cornering at relatively high speeds, and thus requires a high maximum speed and excellent grip force during cornering. However, the tire of the present disclosure is not limited to use in racing as described above.

The motorcycle tire of the present embodiment is a pneumatic tire, and FIG. 1 shows the tire 1 in a dimension-determining state. In the present specification, the dimension-determining state refers to a state for determining the shape of the tire 1, in which the tire 1 is mounted on a standard rim (not shown), inflated to 10 kPa, and loaded with no tire load. The tire 1 is assumed to be in this dimension-determining state unless otherwise noted.

In the present specification, the term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

As shown in FIG. 1, the tire 1 includes a tread portion 2 having a pair of tread edges (Te), a pair of sidewall portions 3, a pair of bead portions 4 each having a bead core 5 embedded therein, a carcass 6 extending between the pair of the bead portions 4, a tread reinforcing layer 7 disposed radially outside the carcass 6 and having reinforcing cords, and a tread rubber 10 disposed radially outside the tread reinforcing layer 7.

In the present embodiment, a ground contact profile (2a) (identified as having no grooves when grooves are present) which is the outline of the outer surface of the tread portion 2 has an arc shape convex outward in the tire radial direction, for example. Further, a tread width TW which is a distance in the tire axial direction between the tread edges (Te) is the maximum tire width (tire section width) of the tire 1 in the present embodiment. As described above, the tread portion 2 in the present embodiment has a structure specific to motorcycle tires which make turns by giving the tires a camber angle by tilting the vehicle body significantly. It should be noted that, in FIG. 1, "H" is the tire cross-sectional height measured from the bead baseline BL, and the tread edges (Te) in the present embodiment are located radially inside the center position of the tire cross-sectional height (H).

The tread portion 2 of the present embodiment includes a crown region (Cr) extending across the tire equatorial plane (C), and a pair of shoulder regions (Sh) each on a respective outer side of the crown region Cr in the tire axial direction.

The crown region (Cr) is the part that comes into contact with the road surface mainly during straightaway driving with a camber angle of zero or close to zero. As an example, the crown region (Cr) is a region centered on the tire equatorial plane (C) and having a length of 30 mm or more, preferably 40 mm or more in the tire axial direction. Further, the crown region (Cr) has the length of 90 mm or less, preferably 80 mm or less in the tire axial direction, and is centered on the tire equatorial plane (C).

It is preferred that a radius of curvature (R) of a ground contact profile (2a) of the crown region (Cr) is smaller than 95% of a tire section width, for example. For convenience, when the "nominal" section width is indicated on the sidewall portions 3, the tire section width is defined as the value of the nominal section width in millimeters. However, when the tire section width is not indicated on the sidewall portions 3, the tire section width is actually measured in the dimension-determining state described above.

When the radius of curvature (R) of the ground contact profile (2a) of the crown region (Cr) is set small as described above, the motorcycle can be smoothly tilted when starting to turn, improving maneuverability at the initial stage of cornering. From such a point of view, it is preferred that the radius of curvature (R) of the ground contact profile (2a) of the crown region (Cr) is 80% or less of the tire section width. However, if the radius of curvature (R) of the ground contact profile (2a) of the crown region (Cr) is excessively small, there is a possibility that stability during straightaway driving may decrease. From such a point of view, the radius of curvature (R) of the ground contact profile (2a) of the crown region (Cr) may be set to 40% or more, and preferably 50% or more, of the tire section width, for example.

Each of the shoulder regions (Sh) is a region from the crown region (Cr) to a respective one of the tread edges (Te). The shoulder regions (Sh) are the regions that come into contact with the road surface during cornering with a camber angle given to the tire 1.

The carcass 6 is composed of at least one carcass ply 6A, and one carcass ply 6A in the present embodiment.

The carcass ply 6A in the present embodiment is a cord ply material made up of a plurality of arranged carcass cords and topping rubber covering the carcass cords. The carcass ply 6A includes a main body portion (6a) extending in a toroidal manner between the bead cores of the bead portions 4, and turned-up portions (6b) each turned up around the bead core 5 in a respective one of the bead portions 4 from inside to outside in the tire axial direction. In the present embodiment, the outer ends of the turned-up portions (6b) terminate radially inward of the tread edges (Te).

The carcass 6 in the present embodiment has a radial structure, for example, and the carcass cords are arranged at an angle from 75 to 90 degrees with respect to the tire equatorial plane (C), for example. For the carcass cords, organic fiber cords such as polyester, nylon, rayon, aromatic polyamide, and the like may be used, for example. In another aspect, a bias structure ply may be used as the carcass 6.

Each of the bead portions 4 in the present embodiment has a bead apex rubber (4a) disposed between the main body portion (6a) and the turned-up portions (6b) of the carcass ply 6A. The bead apex rubber (4a) extends radially outward in a tapered shape from the outer surface of the bead core 5, for example. The bead apex rubbers (4a) are formed of hard rubber and increase bending rigidity of the bead portions 4.

Figure 2:
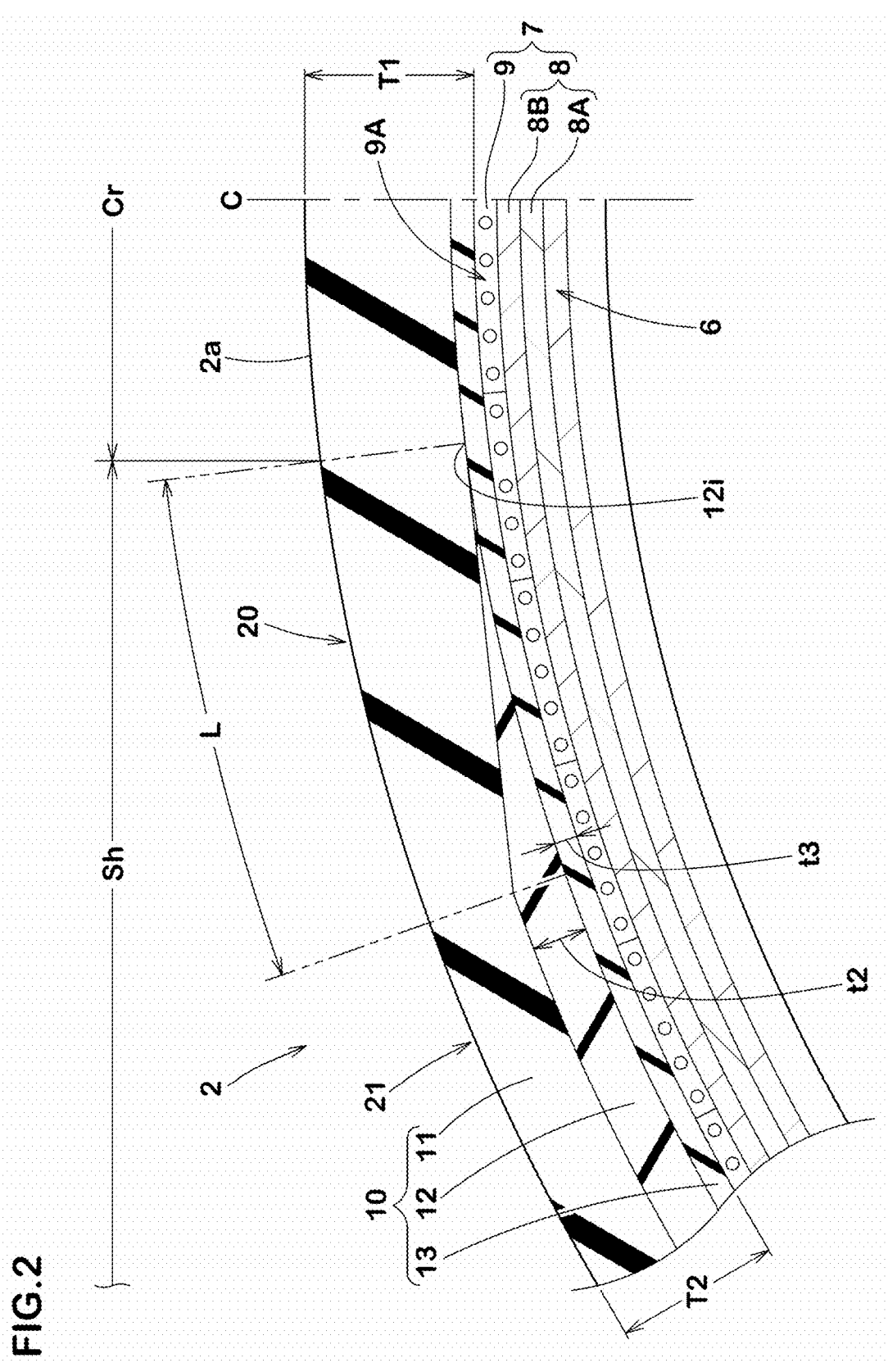
FIG. 2 is a enlarged partial view of a tread portion shown in FIG. 1.

As shown in FIG. 2, the tread reinforcing layer 7 of the present embodiment includes a belt layer 8. The belt layer 8 includes two belt plies 8A and 8B, for example. The belt plies 8A and 8B have the reinforcing cords arranged at an angle from 15 to 45 degrees with respect to the tire equatorial plane (C), for example. The belt plies 8A and 8B are overlapped in the tire radial direction so that the reinforcing cords of the belt ply 8A intersect with the belt cords of the belt ply 8B. Steel cords are suitably used for the reinforcing cords of the belt layer 8.

The tread reinforcing layer 7 in the present embodiment further includes a band layer 9 as an optional element. The band layer 9 is arranged radially outside the belt layer 8. The band layer 9 of the present embodiment includes a jointless band ply 9A formed by spirally winding narrow strips of the reinforcing cords covered with the topping rubber multiple times around the outside of the belt layer 8. The jointless band ply 9A has reinforcing cords arranged at an angle of 5 degrees or less with respect to the tire circumferential direction, for example. The band layer 9 configured as such serves to firmly tighten the belt layer 8 and increase the high-speed durability of the tire 1. The reinforcing cords of the band layer 9 may be made of organic fiber cords such as nylon, rayon, polyester, aromatic polyamide, and the like, for example.

It should be noted that the tread reinforcing layer 7 may be composed of the belt layer 8 or the band layer 9.

Referring to FIG. 1, the tread rubber 10 in the present embodiment extends across the tire equatorial plane (C) from one of the tread edges (Te) to the other one of the tread edges (Te). Further, the tread rubber 10 of the present embodiment has a multi-layer structure in which multiple types of rubber are layered in the tire radial direction. Specifically, the tread rubber 10 includes a surface layer 11 made of a first rubber arranged on the outer side in the tire radial direction, a bottom layer 13 made of a third rubber arranged on the inner side in the tire radial direction, and a pair of middle layers 12 made of a second rubber arranged between the surface layer 11 and the bottom layer 13. The loss tangent tan δ at 100 degrees Celsius of the second rubber is greater than each of the loss tangent tan δ at 100 degrees Celsius of the first rubber and the loss tangent tan δ at 100 degrees Celsius of the third rubber (hereinafter, the notation of the temperature 100 degrees Celsius for the tan δ may be omitted).

In the present specification, the loss tangent tan δ of each rubber is a value measured under the following conditions by using a viscoelasticity spectrometer such as "EPLEXOR" (registered trademark) manufactured by GABO QUALIME-TER Testanlagen GmbH for a test piece taken from the tread rubber 10 of the tire 1. The test piece is 20 mm long×4 mm wide×1 mm thick with the long side extending in the tire circumferential direction.

Measuring temperature: 100 degrees Celsius
Frequency: 5 Hz
Initial tensile strain: 10%
Amplitude of Dynamic strain: ±2.5%

In the tread rubber 10, each of the surface layer 11 and the bottom layer 13 extends from one of the shoulder regions (Sh) through the crown region (Cr) to the other one of the shoulder regions (Sh). In the present embodiment, the surface layer 11 and the bottom layer 13 extend continuously from one end to the other end in the tire axial direction of the tread rubber 10.

On the other hand, each of the middle layers 12 extends through a respective one of the shoulder regions (Sh). Further, each of the middle layers 12 terminates at an inner end (12*i*) in the tire axial direction so as not to be positioned in the crown region (Cr). Furthermore, in the crown region (Cr), the surface layer 11 and the bottom layer 13 are directly connected to each other between the inner ends (12*i*) of the middle layers 12.

Effects of Tire According to Present Embodiment

As a result of the harsh, continuous running during the race, the tread rubber 10 of the tire 1 gradually heats up. In the case of motorcycle tires, the part that is most susceptible to heat accumulation is the crown region (Cr), which is most strongly affected by high-speed straightaway driving. In the tire 1 of the present embodiment, the crown region (Cr) does not have the middle layers 12 made of the second rubber having the highest loss tangent tan δ among the tread rubber 10. As a result, the blow damage in the crown region (Cr), which is severely susceptible to heat accumulation, is suppressed in the tire 1 of the present embodiment.

During cornering at a large camber angle, the middle layers 12, consisting of the second rubber having a large tan δ, are needed to increase the grip force, but at high-speed straightaway driving, such high grip force is not required. Therefore, the middle layers 12 made of the second rubber having a large tan δ are not so important in the crown region (Cr). Rather, the middle layers 12 made of the second rubber having a large tan & increase energy loss and rolling resistance, which may reduce the maximum speed during straightaway driving. In the tire 1 of the present embodiment, the crown region (Cr) does not include the middle layers 12 made of the second rubber, therefore, the energy loss and the rolling resistance of the tread rubber 10 during straightaway driving are decreased. Thereby, it is possible that the tire 1 of the present embodiment increases the maximum speed during straightaway driving.

Further, in the tread rubber 10 of the present embodiment, the middle layers 12 made of second rubber with a large tan δ are arranged in the shoulder regions (Sh) that come into contact with the road surface during cornering. Therefore, it is possible that the tire 1 in the present embodiment exerts a high grip force during cornering.

A more preferred mode of the tire 1 of the present embodiment will now be described.

As shown in FIG. 2, each of the shoulder regions (Sh) in the present embodiment includes a transition region 20 on the inner side in the tire axial direction. The transition region 20 is a region where the thickness of the surface layer 11 increases toward the crown region (Cr) and the thickness of the middle layer 12 decreases toward the crown region (Cr). In each of the transition regions 20 of the present embodiment, a respective one of the middle layers 12 continuously decreases in thickness up to the axially inner end (12*i*) thereof. Similarly, in the each of transition regions 20, the surface layer 11 continuously increases in thickness up to the inner end (12*i*) of a respective one of the middle layers 12.

In each of the transition regions 20 configured as such, the physical properties of the tread rubber 10 change gradually between the crown region (Cr) and a respective one of the shoulder regions (Sh). In addition to the above-mentioned effects, abrupt changes in handling between straightaway driving and cornering is suppressed, therefore, it is possible that excellent steering stability is exerted. In order to more effectively exert such an effect, it is preferred that the transition region 20 has a length (L) (periphery length along the ground contact profile (2*a*)) greater than the total thickness T1 of the tread rubber 10 at the crown region (Cr), for example, and in particular, the length L is preferably 1.2 times or more, more preferably 1.5 times or more the total thickness T1. In the present specification, the total thickness T1 of the tread rubber 10 in the crown region (Cr) is the total thickness of the surface layer 11 and the bottom layer 13 in the crown region (Cr), and if this total thickness varies, it means the maximum thickness.

Further, each of the shoulder regions (Sh) includes a constant region 21 arranged axially outside a respective one of the transition regions 20. The constant region 21 is a region in which each of the surface layer 11, the middle layers 12, and the bottom layer 13 extends with a respective constant thickness. In the present specification, with regard to rubber thickness, a "constant thickness" is determined taking into consideration the tolerances unique to rubber molded products such as pneumatic tires, and specifically, a thickness in which the difference between the maximum thickness and the minimum thickness is within about 10% of the maximum thickness is understood to be at least a constant thickness. The constant regions 21 configured as such make the physical properties of the shoulder regions (Sh) constant in the tire axial direction, thereby, it is possible that stable cornering characteristics are exerted.

[Rubber Thickness, Etc.]

In the crown region (Cr), it is preferred that the total thickness T1 of the tread rubber 10 is in the range from 5.0 to 9.0 mm, for example.

By setting the total thickness T1 of the tread rubber 10 in the crown region (Cr) to 5.0 mm or more, it is possible that sufficient grip force in the crown region (Cr) is ensured, therefore, straight running stability during running on a circuit is improved, and it is further possible that sufficient rear braking force is ensured when braking upright. From such a point of view, it is even more preferred that the total thickness T1 of the tread rubber 10 in the crown region (Cr) is 5.5 mm or more, for example.

By setting the total thickness T1 of the tread rubber 10 in the crown region (Cr) to 9.0 mm or less, it is possible that blow damage resistance and the grip force in the crown region (Cr) are both achieved in a good balance. From such a point of view, it is more preferred that the total thickness T1 of the tread rubber 10 in the crown region (Cr) is 8.5 mm or less, for example.

In each of the shoulder regions (Sh), it is also preferred that the total thickness T2 of the tread rubber 10 is set in the range from 5.0 to 9.0 mm for example. The total thickness T2 of the tread rubber 10 in each of the shoulder regions (Sh) is the total thickness of the surface layer 11, a respective one of the middle layers 12, and the bottom layer 13 in a respective one of the shoulder regions (Sh), and if this total thickness varies, it means the maximum thickness.

it is preferred that the middle layer 12 in each of the shoulder regions (Sh) has a thickness (t2) of 10% or more of the total thickness T2 of the tread rubber 10. By setting the thickness t2 of each of the middle layers 12 to 10% or more of the total thickness T2, the grip force in the shoulder regions (Sh) is increased, thereby, it is possible that the propulsive force when exiting a corner is improved. From such a perspective, it is further preferred that the thickness (t2) of each of the middle layers 12 is 20% or more of the total thickness T2 of the tread rubber 10, for example.

It is preferred that the thickness (t2) of the middle layer 12 in each of the shoulder regions (Sh) is 60% or less of the total thickness T2 of the tread rubber 10. By setting the thickness (t2) of each of the middle layers 12 to 60% or less of the total thickness T2, it is possible that excessive heat accumulation in each of the shoulder regions (Sh) is suppressed. From such a point of view, it is even more preferred that the thickness (t2) of each of the middle layers 12 is 50% or less of the total thickness T2, for example.

In the crown region (Cr) and each of the shoulder regions (Sh), it is preferred that the bottom layer 13 has a thickness (t3) of 5% or more of the combined thickness (the maximum combined thickness if it varies) of the thickness of the surface layer 11 and the thickness of a respective one of the middle layers 12. Generally, the second rubber with high tan δ contains a large amount of oil, and if this oil component migrates to the reinforcing cords on the inner side of the tire, the function of the middle layers 12 to increase the grip force is decreased and the physical properties of the reinforcing cords are deteriorated. By specifying the thickness (t3) of the bottom layer 13 as in the present embodiment, it is possible that the bottom layer 13 acts as a barrier to effectively prevent the oil in the second rubber from migrating to the tread reinforcing layer 7, and thereby, it is possible that the high tan δ physical properties of the second rubber is secured over the long term. From such a viewpoint, it is even more preferred that the thickness (t3) of the bottom layer 13 is 10% or more of the combined thickness of the thickness of the surface layer 11 combined with the thickness of one of the middle layers 12.

In the crown region (Cr) and each of the shoulder regions (Sh), the thickness (t3) of the bottom layer 13 is preferably 30% or less of the combined thickness of the surface layer 11 and a respective one of the middle layers 12. Within the constraints of the total thickness of the tread rubber 10, if the thickness (t3) of the bottom layer 13 is increased, the thicknesses of the surface layer 11 and the middle layers 12 will be decreased, therefore, it is possible that the grip force and wear resistance are impaired. From this point of view, it is even more preferred that the thickness (t3) of the bottom layer 13 is 20% or less of the combined thickness of the surface layer 11 and each of the middle layers 12.

[Loss Tangent Tan δ]

In order to exert a high grip force during cornering, the loss tangent tan δ of the second rubber may be 0.30 or more, preferably 0.35 or more, and more preferably 0.40 or more, for example. On the other hand, if the loss tangent tan δ of the second rubber is excessively large, the energy loss may be increased. From such a point of view, the loss tangent tan δ of the second rubber may be, for example, 0.60 or less, preferably 0.55 or less, and more preferably 0.50 or less, in combination with any of the lower limit values mentioned above.

In order to more effectively suppress the blow damage due to the heat accumulation during high-speed straightaway driving, the loss tangent tan δ of the first rubber that forms the surface layer 11 may be set to 0.40 or less, preferably 0.35 or less, and more preferably 0.32 or less, for example. Further, from the perspective of suppressing a significant decrease in the grip force during high-speed straightaway driving, the loss tangent tan δ of the first rubber may be set to, for example, 0.20 or more, preferably 0.25 or more, and more preferably 0.27 or more, in combination with any of the upper limit values mentioned above.

In order to more effectively suppress the blow damage due to the heat accumulation during high-speed straightaway driving, it is preferred that the loss tangent tan δ at 100 degrees Celsius of the third rubber that forms the bottom layer 13 is smaller than the loss tangent tan δ of the second rubber at 100 degrees Celsius. In particular, the loss tangent tan δ of the third rubber at 100 degrees Celsius may be 0.35 or less, preferably 0.30 or less, and more preferably 0.28 or less, for example. Further, from the point of view of suppressing a significant decrease in the grip force during straightaway driving, the loss tangent tan δ of the third rubber may be, for example, 0.15 or more, preferably 0.20 or more, and more preferably 0.23 or more, in combination with any of the upper limit values described above.

[300% Modulus of First Rubber]

It is preferred that the 300% modulus at 100 degrees Celsius (hereinafter, the temperature 100 degrees Celsius may be omitted) of the first rubber which forms surface layer 11 is greater than the 300% modulus at 100 degrees Celsius of the second rubber that forms the middle layers 12. The first rubber configured as such exhibits excellent wear resistance, although its grip force is inferior to that of the second rubber of the middle layers 12. Therefore, excellent wear resistance is exerted throughout the entire range of the crown region (Cr) and shoulder regions (Sh).

In the present specification, the 300% modulus is the modulus when a rubber test piece is elongated by 300%, and means the tensile stress (MPa) M300 at 300% elongation measured under the condition of 100 degrees Celsius in accordance with Japanese Industrial Standards JIS-K6251 "Rubber, vulcanized or thermoplastic—Determination of tensile stress—strain properties".

In order to effectively exert the above-mentioned wear resistance, the 300% modulus of the first rubber may be 3.0 (MPa) M300 or more, preferably 3.5 (MPa) M300 or more, and more preferably 4.3 (MPa) M300 or more, for example.

Further, in order to suppress a significant decrease in the grip force, the 300% modulus of the first rubber may be 7.0 (MPa) M300 or less, preferably 6.0 (MPa) M300 or less, and more preferably 5.0 (MPa) M300 or less, for example.

While detailed description has been made of the mold 1 and the tire 100 according to the present disclosure, the present disclosure can be embodied in various forms without being limited to the illustrated embodiments and modifications.

Statement of Disclosure

The present disclosure includes the following aspects.

Present Disclosure 1

A motorcycle tire including:
a tread portion having a pair of tread edges;
a pair of sidewall portions;
a pair of bead portions;
a carcass extending between the bead portions;
a tread reinforcing layer arranged radially outside the carcass and having reinforcing cords; and
a tread rubber arranged radially outside the tread reinforcing layer, wherein
the tread portion includes a crown region extending across a tire equatorial plane, and a pair of shoulder regions each located axially outside the crown region on a respective axial side thereof,
each of the shoulder regions includes a respective one of the tread edges,
the tread rubber includes a surface layer made of a first rubber arranged on the outer side in the tire radial direction, a bottom layer made of a third rubber arranged on the inner side in the tire radial direction, and a pair of middle layers made of a second rubber arranged between the surface layer and the bottom layer,
the second rubber has a loss tangent tan δ at 100 degrees Celsius greater than a loss tangent tan δ at 100 degrees Celsius of the first rubber and a loss tangent tan δ at 100 degrees Celsius of the third rubber,
each of the surface layer and the bottom layer extends from one of the shoulder regions to the other one of the shoulder regions through the crown region,
each of the middle layers extends through a respective one of the shoulder regions to have an inner end in the tire axial direction terminating so as not to be positioned in the crown region, and
the surface layer and the bottom layer are directly connected to each other in the crown region.

Present Disclosure 2

The motorcycle tire according to Present Disclosure 1, wherein each of the shoulder regions includes a transition region in which a thickness of the surface layer increases toward the crown region and a thickness of the middle layer decreases toward the crown region.

Present Disclosure 3

The motorcycle tire according to Present Disclosure 2, wherein
in each of the shoulder regions, a constant region is arranged axially outside the transition region, and the surface layer, the middle layers, and the bottom layer extend with constant thicknesses in the constant region.

Present Disclosure 4

The motorcycle tire according to any one of Present Disclosures 1 to 3, wherein the bottom layer has a constant thickness in the crown region and the shoulder regions.

Present Disclosure 5

The motorcycle tire according to any one of Present Disclosures 1 to 4, wherein the first rubber has a 300% modulus at 100 degrees Celsius greater than a 300% modulus at 100 degrees Celsius of the second rubber.

Present Disclosure 6

The motorcycle tire according to any one of Present Disclosures 1 to 5, wherein a radius of curvature of a ground contact profile of the crown region is smaller than 95% of a tire section width in a dimension-determining state in which the motorcycle tire is mounted on a standard rim, inflated to 10 kPa, and loaded with no tire load.

Present Disclosure 7

The motorcycle tire according to any one of Present Disclosures 1 to 6, wherein the crown region is a region centered on the tire equatorial plane and having a length in the range from 30 to 90 mm.

Present Disclosure 8

The motorcycle tire according to any one of Present Disclosures 1 to 7, wherein the tread rubber has a total thickness in the range from 5.0 to 9.0 mm in the crown region.

Present Disclosure 9

The motorcycle tire according to any one of Present Disclosures 1 to 8, wherein
in each of the shoulder regions, the tread rubber has a total thickness in the range from 5.0 to 9.0 mm, and
each of the middle layers has a thickness in the range from 10% to 60% of the total thickness of the tread rubber.

Present Disclosure 10

The motorcycle tire according to any one of Present Disclosures 1 to 9, wherein the bottom layer has a thickness in the range from 5% to 30% of a combined thickness of a thickness of the surface layer and a thickness of each of the middle layers.

Present Disclosure 11

The motorcycle tire according to any one of Present Disclosures 1 to 10, wherein
a tread width is a distance in the tire axial direction from one of the tread edges to the other one of the tread edges, and
the tread width is the maximum tire width of the motorcycle tire.

Present Disclosure 12

The motorcycle tire according to any one of Present Disclosures 1 to 11, wherein the loss tangent tan δ of the second rubber is 0.30 or more and 0.60 or less.

Present Disclosure 13

The motorcycle tire according to any one of Present Disclosures 1 to 12, wherein the loss tangent tan δ of the first rubber is 0.20 or more and 0.40 or less.

Present Disclosure 14

The motorcycle tire according to any one of Present Disclosures 1 to 13, wherein the loss tangent tan δ of the third rubber is 0.15 or more and 0.35 or less.

Present Disclosure 15

The motorcycle tire according to Present Disclosure 2 or 3, wherein a length of the transition region is 1.2 times or more a total thickness of the tread rubber in the crown region.

Present Disclosure 16

The motorcycle tire according to Present Disclosure 5, wherein the 300% modulus of the first rubber is 3.0 MPa M300 or more and 7.0 MPa M300 or less.

Present Disclosure 17

The motorcycle tire according to Present Disclosure 6, wherein the radius of curvature of the ground contact profile of the crown region is 40% or more of the tire section width.

Present Disclosure 18

The motorcycle tire according to Present Disclosure 7, wherein the length of the crown region is 40 mm or more.

Present Disclosure 19

The motorcycle tire according to Present Disclosure 7, wherein the length of the crown region is 80 mm or less.

Present Disclosure 20

The motorcycle tire according to Present Disclosure 9, wherein the thickness of each of the middle layers is 20% or more and 50% or less of the total thickness of the tread rubber.

DESCRIPTION OF REFERENCE SIGNS 1 motorcycle tire
2 tread portion
2a ground contact profile
3 sidewall portion
4 bead portion
6 carcass
7 tread reinforcing layer
10 tread rubber
11 surface layer
12 middle layer
12i inner end 13 bottom layer
20 transition region
21 constant region
C tire equatorial plane
Cr crown region
Sh shoulder region

The invention claimed is:

1. A motorcycle tire comprising:
a tread portion having a pair of tread edges;
a pair of sidewall portions;
a pair of bead portions;
a carcass extending between the bead portions;
a tread reinforcing layer arranged radially outside the carcass and having reinforcing cords; and
a tread rubber arranged radially outside the tread reinforcing layer, wherein
the tread portion includes a crown region extending across a tire equatorial plane, and a pair of shoulder regions each located axially outside the crown region on a respective axial side thereof,
each of the shoulder regions includes a respective one of the tread edges,
the tread rubber includes a surface layer made of a first rubber arranged on the outer side in the tire radial direction, a bottom layer made of a third rubber arranged on the inner side in the tire radial direction, and a pair of middle layers made of a second rubber arranged between the surface layer and the bottom layer,
the second rubber has a loss tangent tan δ at 100 degrees Celsius greater than a loss tangent tan δ at 100 degrees Celsius of the first rubber and a loss tangent tan δ at 100 degrees Celsius of the third rubber,
each of the surface layer and the bottom layer extends from one of the shoulder regions to the other one of the shoulder regions through the crown region,
each of the middle layers extends through a respective one of the shoulder regions to have an inner end in the tire axial direction terminating so as not to be positioned in the crown region, and
the surface layer and the bottom layer are directly connected to each other in the crown region.

2. The motorcycle tire according to claim 1, wherein each of the shoulder regions includes a transition region in which a thickness of the surface layer increases toward the crown region and a thickness of the middle layer decreases toward the crown region.

3. The motorcycle tire according to claim 2, wherein a length of the transition region is 1.2 times or more a total thickness of the tread rubber in the crown region.

4. The motorcycle tire according to claim 2, wherein
in each of the shoulder regions, a constant region is arranged axially outside the transition region, and
the surface layer, the middle layers, and the bottom layer extend with constant thicknesses in the constant region.

5. The motorcycle tire according to claim 1, wherein the bottom layer has a constant thickness in the crown region and the shoulder regions.

6. The motorcycle tire according to claim 1, wherein the first rubber has a 300% modulus at 100 degrees Celsius greater than a 300% modulus at 100 degrees Celsius of the second rubber.

7. The motorcycle tire according to claim 6, wherein the 300% modulus of the first rubber is 3.0 MPa M300 or more and 7.0 MPa M300 or less.

8. The motorcycle tire according to claim 1, wherein a radius of curvature of a ground contact profile of the crown region is smaller than 95% of a tire section width in a dimension-determining state in which the motorcycle tire is mounted on a standard rim, inflated to 10 kPa, and loaded with no tire load.

9. The motorcycle tire according to claim 8, wherein the radius of curvature of the ground contact profile of the crown region is 40% or more of the tire section width.

10. The motorcycle tire according to claim 1, wherein the crown region is a region centered on the tire equatorial plane and having a length in the range from 30 to 90 mm.

11. The motorcycle tire according to claim 10, wherein the length of the crown region is 40 mm or more.

12. The motorcycle tire according to claim 10, wherein the length of the crown region is 80 mm or less.

13. The motorcycle tire according to claim 1, wherein the tread rubber has a total thickness in the range from 5.0 to 9.0 mm in the crown region.

14. The motorcycle tire according to claim 1, wherein in each of the shoulder regions, the tread rubber has a total thickness in the range from 5.0 to 9.0 mm, and each of the middle layers has a thickness in the range from 10% to 60% of the total thickness of the tread rubber.

15. The motorcycle tire according to claim 14, wherein the thickness of each of the middle layers is 20% or more and 50% or less of the total thickness of the tread rubber.

16. The motorcycle tire according to claim 1, wherein the bottom layer has a thickness in the range from 5% to 30% of a combined thickness of a thickness of the surface layer and a thickness of each of the middle layers.

17. The motorcycle tire according to claim 1, wherein a tread width is a distance in the tire axial direction from one of the tread edges to the other one of the tread edges, and the tread width is the maximum tire width of the motorcycle tire.

18. The motorcycle tire according to claim 1, wherein the loss tangent tan δ of the second rubber is 0.30 or more and 0.60 or less.

19. The motorcycle tire according to claim 1, wherein the loss tangent tan δ of the first rubber is 0.20 or more and 0.40 or less.

20. The motorcycle tire according to claim 1, wherein the loss tangent tan δ of the third rubber is 0.15 or more and 0.35 or less.

\* \* \* \* \*